US008115852B2

(12) United States Patent
Toyoda (10) Patent No.: US 8,115,852 B2
(45) Date of Patent: Feb. 14, 2012

(54) CONTRAST CONTROL FOR USE IN IMAGE DISPLAY APPARATUS AND IMAGE PICKUP APPARATUS

(75) Inventor: Tetsuya Toyoda, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 585 days.

(21) Appl. No.: 12/136,971

(22) Filed: Jun. 11, 2008

(65) Prior Publication Data

US 2008/0316349 A1 Dec. 25, 2008

(30) Foreign Application Priority Data

Jun. 19, 2007 (JP) ................... 2007-161483

(51) Int. Cl.
*H04N 5/222* (2006.01)
*H04N 5/14* (2006.01)
(52) U.S. Cl. .................... 348/333.01; 348/673
(58) Field of Classification Search ............. 348/333.02, 348/333.12, 333.13, 254, 673, 678, 333.01
See application file for complete search history.

(56) References Cited

U.S. PATENT DOCUMENTS

| | | | | |
|---|---|---|---|---|
| 2003/0081133 A1* | 5/2003 | Lee et al. | .................... | 348/229.1 |
| 2003/0099407 A1* | 5/2003 | Matsushima | ................ | 382/274 |
| 2005/0046728 A1* | 3/2005 | Schinner | .................. | 348/333.09 |
| 2005/0117813 A1* | 6/2005 | Nishida et al. | ................ | 382/275 |
| 2006/0268180 A1* | 11/2006 | Chou | ............................ | 348/673 |
| 2009/0033785 A1* | 2/2009 | Fujinawa et al. | ........ | 348/333.01 |

FOREIGN PATENT DOCUMENTS

| | | |
|---|---|---|
| JP | 2733386 | 3/1998 |
| JP | 3692321 | 9/2005 |
| JP | 2005-308949 | 11/2005 |

OTHER PUBLICATIONS

Notification of the First Office Action for Chinese Application No. 200810128617.6, mailed Dec. 25, 2009 (4 pgs.) with translation (7 pgs.).

* cited by examiner

*Primary Examiner* — David Ometz
*Assistant Examiner* — Carramah J Quiett
(74) *Attorney, Agent, or Firm* — John C. Pokotylo; Straub & Pokotylo (57) ABSTRACT

An image display apparatus includes a display which displays an image based on an image signal. An ambient light measuring unit measures the intensity of ambient light around the display. A brightness distribution measuring unit measures a brightness distribution in a scene when the image signal is obtained. A parameter calculator calculates a correction parameter for correcting a partial contrast of the image based on the ambient light intensity and brightness distribution in the scene. A contrast correction unit corrects a partial contrast of the image by correcting the image signal by using the calculated correction parameter.

11 Claims, 6 Drawing Sheets

| Operation mode | Ambient light | Correction table | |
|---|---|---|---|
| | | Default | Cumulative histogram |
| Record | — | k | 1.0−k |
| Live view | Dark | k | 1.0−k |
| Live view | Normal | k−0.2 | 1.2−k |
| Live view | Bright | 0.1 | 0.9 |
| Play | Dark | 1.0 | 0.0 |
| Play | Normal | k+0.3 | 0.7−k |
| Play | Bright | k+0.1 | 0.9−k |

CONTRAST CONTROL FOR USE IN IMAGE DISPLAY APPARATUS AND IMAGE PICKUP APPARATUS

CROSS-REFERENCE TO RELATED APPLICATIONS

This application is based upon and claims the benefit of priority from Japanese Patent Application No. 2007-161483, filed Jun. 19, 2007, the entire contents of which are incorporated herein by reference.

BACKGROUND OF THE INVENTION

1. Field of the Invention

The present invention relates to an image display apparatus, an image pickup apparatus, an image reproducing apparatus, and an image displaying method. In particular, the present invention relates to an image display apparatus, an image pickup apparatus, an image reproducing apparatus, and an image displaying method, which can improve visibility of displayed images outdoors.

2. Description of the Related Art

Visibility of images displayed on the screen of a display depends on ambient light around the display.

Particularly, in a display provided in equipment such as a digital camera mostly used outdoors, visibility is often affected by ambient light.

A technique to improve visibility of a display affected by ambient light has been proposed by Japanese Patent No. 3692321, for example. In Japanese Patent No. 3692321, the brightness of ambient light is measured, and backlight of a display and contrast of a displayed image are adjusted depending on the measured brightness of the ambient light, thereby improving visibility. Japanese Patent No. 2733386 has proposed a technique to improve visibility by performing γ-correction for a display signal depending on brightness of the ambient light and brightness of a subject.

BRIEF SUMMARY OF THE INVENTION

According to a first aspect of the invention, there is provided, an image display apparatus comprising: a display which displays an image based on an image signal; an ambient light measuring unit which measures the intensity of ambient light around the display; a brightness distribution measuring unit which measures a brightness distribution in a scene when the image signal is obtained; a parameter calculator which calculates a correction parameter for correcting a partial contrast of the image based on the ambient light intensity and brightness distribution in the scene; and a contrast correction unit which corrects a partial contrast of the image by correcting the image signal by using the calculated correction parameter.

According to a second aspect of the invention, there is provided, an image pickup apparatus comprising: an image pickup unit which shoots a scene to obtain an image signal; an image recorder which records the obtained image signal on a recording medium; a display which displays an image based on the image signal; an ambient light measuring unit which measures the intensity of ambient light around the display; a brightness distribution measuring unit which measures a brightness distribution in a scene when the image signal is obtained; a parameter calculator which calculates a recording correction parameter for correcting a partial contrast of an image to be recorded on the recording medium based on the brightness distribution in the scene, and calculates a display correction parameter for correcting a partial contrast of an image to be displayed in the display based on the ambient light intensity and brightness distribution in the scene; and a contrast correction unit which corrects a partial contrast of an image to be recorded on the recording medium by using the recording correction parameter, and corrects a partial contrast of an image to be displayed in the display by using the display correction parameter.

According to a third aspect of the invention, there is provided, an image reproducing apparatus comprising: a reading unit which reads an image signal obtained by shooting a scene and a composite ratio determining parameter for calculating a reproduction correction parameter used for a partial contrast correction when reproducing the image signal, from a recording medium; a display which reproduces the read image signal to display an image; an ambient light measuring unit which measures the intensity of ambient light around the display; a parameter calculator which includes: (1) a fixed contrast correction table memory which stores a fixed contrast correction table for making fixed contrast correction of the read image signal; (2) a cumulative histogram calculator which calculates a cumulative histogram by accumulating the brightness distribution measured by the brightness measuring unit; and (3) a composite unit which calculates the reproduction correction parameter by composing the fixed contrast correction table and cumulative histogram at a composite ratio determined based on the composite ratio determining parameter and the intensity of ambient light measured by the ambient light measuring unit; and a contrast correction unit which corrects a partial contrast of the image by correcting the read image signal by using the calculated reproduction correction parameter.

According to a fourth aspect of the invention, there is provided, an image displaying method comprising: measuring the intensity of ambient light around a display; measuring the brightness distribution in a scene when obtaining an image signal to indicate an image to be displayed in the display; calculating a parameter for correcting a partial contrast of the image based on the ambient light intensity and the brightness distribution in the scene; correcting a partial contrast of the image by correcting the image signal by using the calculated parameter; and displaying the contrast corrected image in the display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be explained with reference to the accompanying drawings.

Figure 1:
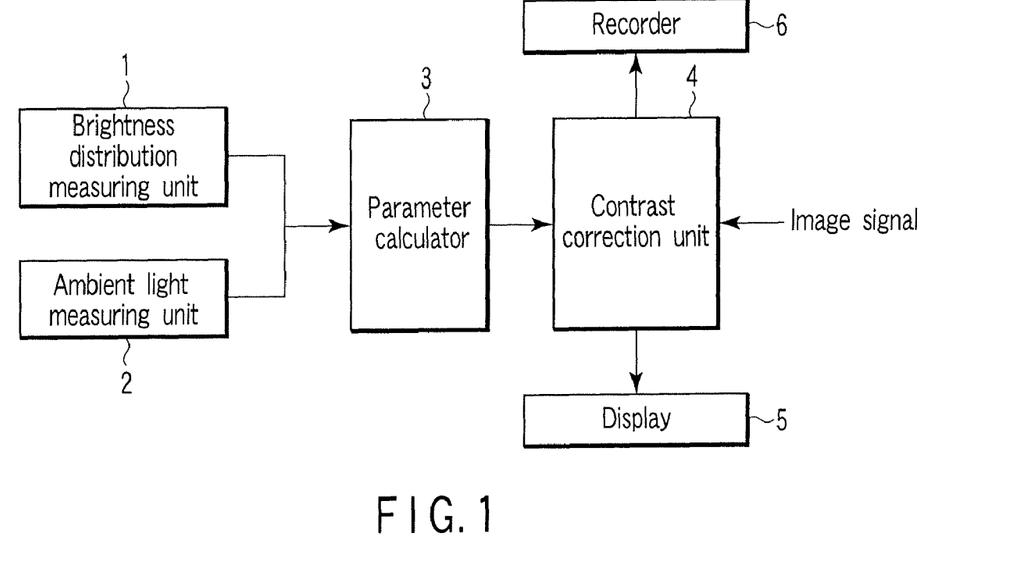
FIG. 1 is a block diagram showing a conceptual configuration of an image pickup apparatus including an image display apparatus according to an embodiment of the invention.

FIG. 1 is a block diagram showing a conceptual configuration of an image pickup apparatus including an image display apparatus according to an embodiment of the invention. As shown in FIG. 1, the image pickup apparatus according to this embodiment has a brightness distribution measuring unit 1, an ambient light measuring unit 2, a parameter calculator 3, a contrast correction unit 4, a display 5, and a recorder 6.

The brightness distribution measuring unit 1 measures a brightness distribution in a scene obtained from an image signal input to the image pickup apparatus. The ambient light measuring unit 2 measures the intensity of ambient light around the display 5.

The parameter calculator 3 calculates a correction parameter for correcting the contrast of an image signal in the contrast correction unit 4 for each predetermined area (included one pixel), based on the brightness distribution in the scene measured by the brightness distribution measuring unit 1 and the intensity of ambient light measured by the ambient light measuring unit 2. The correction parameter is different depending on whether the image signal input to the contrast correction unit 4 is used for displaying or recording. A method of calculating the correction parameter will be explained in detail later.

The contrast correction unit 4 corrects the contrast of the image signal in the corresponding predetermined area, by using the correction parameter for each predetermined area calculated by the parameter calculator 3.

The display 5 displays an image based on the image signal whose contrast was corrected in the contrast correction unit 4. The recorder 6 records the image signal whose contrast was corrected in the contrast correction unit 4.

Figure 2:
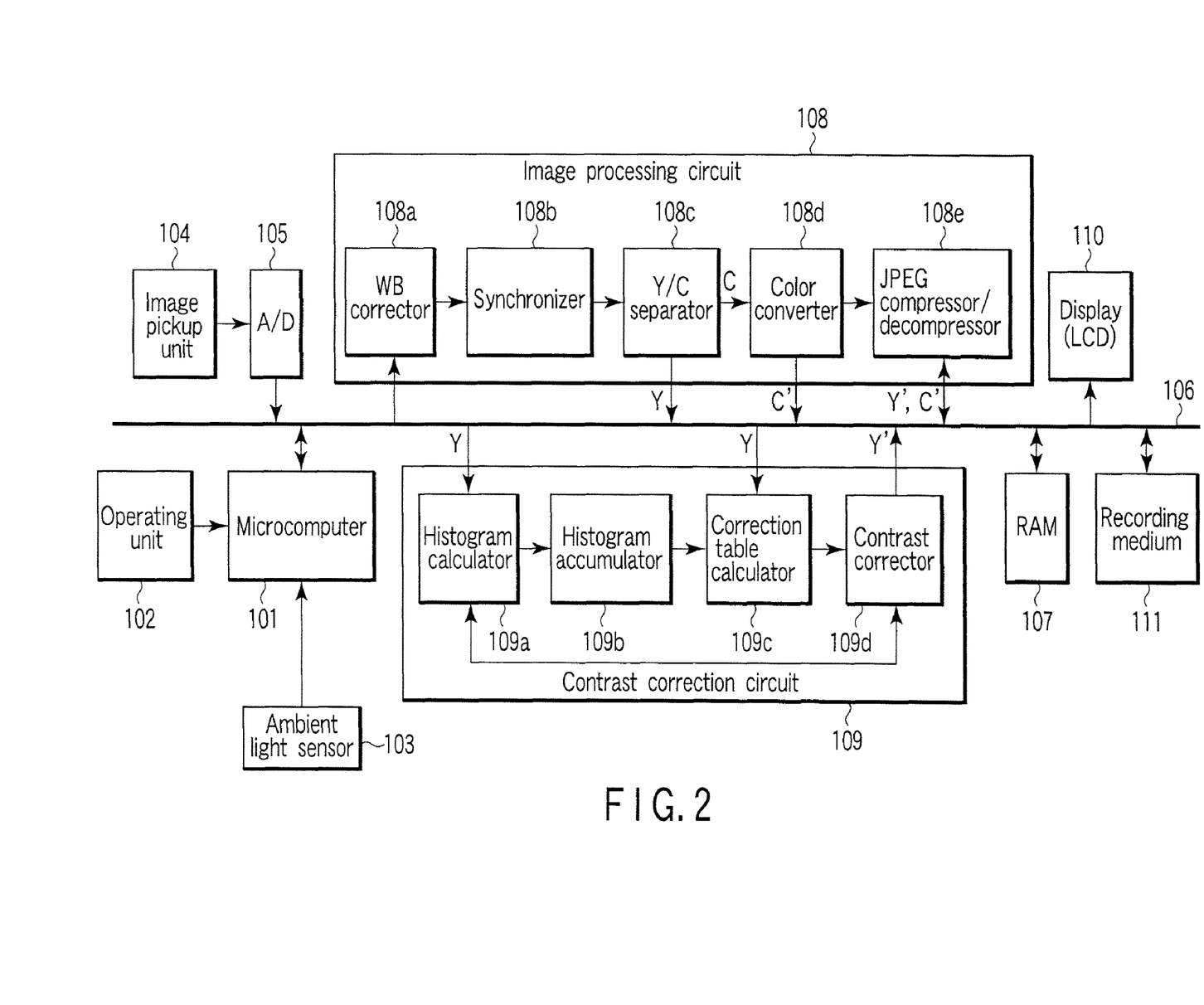
FIG. 2 is a block diagram showing a configuration of a digital camera as an example of the image pickup apparatus shown in FIG. 1.

Hereinafter, the image pickup apparatus of FIG. 1 will be explained in detail. FIG. 2 is a block diagram showing the configuration of a digital camera as an example of the image pickup apparatus shown in FIG. 1. The digital camera shown in FIG. 2 has a microcomputer 101, an operating unit 102, an ambient light sensor 103, an image pickup unit 104, an A/D converter 105, a bus 106, a RAM 107, an image processing circuit 108, a contrast correction circuit 109, a display (LCD) 110, and a recording medium 111.

The microcomputer 101 assumes centralized control of various sequences of a digital camera. The operating unit 102 and ambient sensor 103 are connected to the microcomputer 101. The operating unit 102 is an operating member including a power supply button to turn on/off the power supply of a digital camera, a release button to give a digital camera an instruction to record an image, a play button to set a digital camera in play mode, an operating unit to set the scene mode, and various input keys. When the operating unit 102 is operated by the user, the microcomputer 101 executes various sequences corresponding to the operations of the operating unit 102. The ambient sensor 103, which functions as the ambient light measuring unit 2, is arranged around the display unit 110, receives ambient light around the display unit 110, and outputs a signal corresponding to the intensity of the received ambient light to the microcomputer 101.

The image pickup unit 104 comprises an optical system, and an image pickup element. The optical system is optics for condensing an image from a not-shown subject. The image pickup element converts incident light entering through the optical system to an analog electric signal (an image signal). The A/D converter 105 converts the analog electric signal obtained from the image pickup unit 104 to a digital electric signal (image data).

The bus 106 is a transfer path to send various data generated in the digital camera to each part of a camera. The bus 106 is connected to the microcomputer 101, A/D converter 105, RAM 107, image processing circuit 108, contrast correction circuit 109, display 110, and recording medium 111. The RAM 107 temporarily stores image data obtained in the A/D converter 105, and various data processed in the image processing circuit 108 and contrast correction circuit 109.

The image processing circuit 108 reads and processes image data obtained in the A/D converter 105 and stored in the RAM 107. The image processing circuit 108 has a white balance (WB) corrector 108a, a synchronizer 108b, a Y/C separator 108c, a color converter 108d, and a JPEG compressor/decompressor 108e.

The WB corrector 108a corrects the white balance of image data by multiplying a red component (R-data) and a blue component (B-data) of the image data read from the RAM 107, by white balance correction values instructed from the microcomputer 101. The synchronizer 108b generates image data taking three R, G and B colors as one pixel component, from Bayer arranged image data output from the WB corrector 108a. The Y/C separator 108c separates the image data output from the synchronizer 108b into brightness data (Y) and color difference data (C). The Y/C separator 108c outputs the brightness data to the RAM 107, and the color difference data to the color converter 108d. The color converter 108d corrects the color of the image by color conversion of color difference data output from the synchronizer 108b, according to a color matrix instructed from the microcomputer 101. The color converter 108d stores the corrected color difference data (C') in the RAM 107. The JPEG compressor/decompressor 108e reads the image processed image data (brightness data Y' and color difference data C') from the RAM 107, and compresses the read image data according to the JPEG scheme. The JPEG compressor/decompressor 108e also has a function of reading and decompressing compressed image data.

The contrast correction circuit 109 corrects the contrast of the brightness data obtained in the Y/C separator 108c. The contrast correction circuit 109 has a histogram calculator 109a, a histogram accumulator 109b, a correction table calculator 109c, and a contrast corrector 109d.

Figure 3:
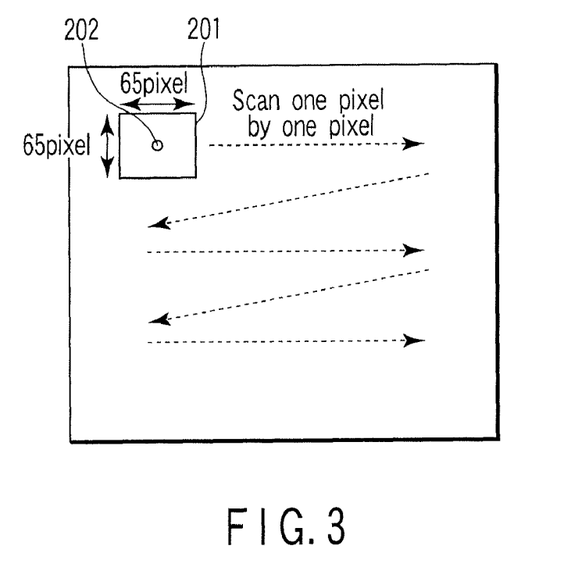
FIG. 3 is a view showing an example of a histogram calculation area.

The histogram calculator 109a, which has a function as the brightness distribution measuring unit 1, calculates a histogram indicating a brightness distribution in a scene obtained from the brightness data for one screen obtained in the Y/C separator 108c, in units of predetermined histogram calculation areas. FIG. 3 shows an example of a histogram calculation area. A histogram calculation area 201 is a square area around a pixel 202 as an object of partial contrast correction, to be described later. The histogram calculation area 201 is shifted by one pixel in the horizontal direction whenever the contrast of an object pixel is corrected, and shifted by one pixel in the vertical direction whenever the contrast correction in the horizontal direction is completed. In the example of FIG. 3, the histogram calculation area 201 is assumed to be an area of 65×65 pixels, but this is not a limitation.

The histogram accumulator 109*b* obtains a cumulative histogram by accumulating the histogram in the histogram calculation area 201 calculated by the histogram calculator 109*a* from the lower brightness side. The correction table calculator 109*c* calculates a correction table as an example of a correction parameter for the contrast correction by using the cumulative histogram obtained by the histogram accumulator 109*b*. The contrast corrector 109*d* corrects the contrast of the brightness data of a center pixel 202 in the histogram calculation area 201, based on the correction table calculated by the correction table calculator 109*c*, and outputs the contrast corrected brightness data (Y') to the RAM 107.

When the contrast correction is performed for the center pixel 202 in the histogram calculation area 201, the contrast cannot be corrected at the end portion of the screen shown in FIG. 3. Therefore, it is desirable to regard the pixel at the screen end portion as a pixel not used for displaying and recording. The number of pixels at the screen end portion can be decreased by decreasing the number of pixels in the histogram calculation area 201.

The display 110 is a liquid crystal display (LCD), for example, and displays images obtained through the image pickup unit 104, and various images recorded on the recording medium 111. The recording medium 111 is a memory card configured to be freely inserted into and removed from a digital camera, for example, and records image data compressed by the JPEG compressor/decompressor 108*e* in the image processing circuit 108.

Hereinafter, an explanation will be given on the operation of the digital camera shown in FIG. 2. In this embodiment, the contrast correction is different depending on whether the digital camera operation mode is live view mode, record mode, or play mode. In the live view mode, the image obtained by the image pickup unit 104 is displayed real time in the display 110. In the record mode, the image obtained by the image pickup unit 104 is recorded on the recording medium 111. In the play mode, the image recorded on the recording medium 111 is displayed in the display 110.

In this embodiment, after the power is turned on, the digital camera operation mode is first set to live view mode. When the release button of the operating unit 102 is pressed during live view mode, the operation mode is changed to record mode. When the play button of the operating unit 102 is pressed during live view mode, the operation mode is changed to play mode.

Figure 4:
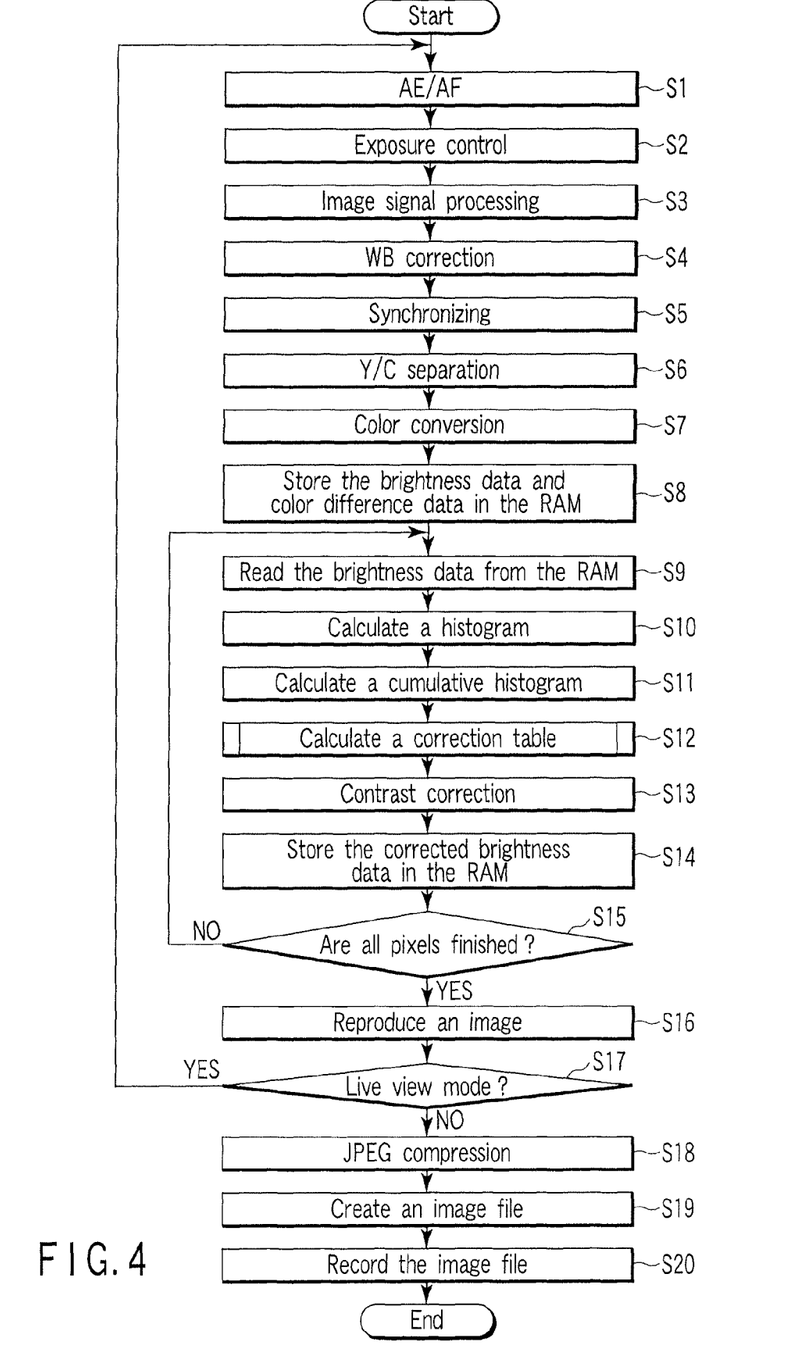
FIG. 4 is a flowchart showing the operation control when the digital camera of FIG. 2 is in live view mode or record mode.

FIG. 4 is a flowchart showing the operation control when the operation mode of the digital camera is live view mode or record mode. In FIG. 4, the microcomputer 101 first executes automatic exposure adjustment (AE) and automatic focus adjustment (AF) (step S1). The AE and AF adjustments may be executed by a conventional known method. For example, the AE adjustment is performed by evaluating the brightness of a scene at the time of shooting from the image data obtained in the image pickup unit 104, and determining an appropriate exposure condition according to this evaluation. The AF adjustment is performed by evaluating the contrast of the image from the image data obtained in the image pickup unit 104, and moving the focus adjustment lens included in the optical system until the contrast becomes maximum.

After the AE and AF adjustments, the microcomputer 101 controls the amount of light applied to the image pickup unit 104 and the exposure time of the image pickup unit 104, so that the amount of exposure in the image pickup unit 104 becomes optimum (step S2). By this exposure control, an image signal can be obtained in the image pickup unit 104. Then, the image signal obtained in the image pickup unit 104 is processed (step S3). By this processing, the image signal obtained in the image pickup unit 104 is read under the control of the microcomputer 101, converted to digital image data in the A/D converter 105, and stored in the RAM 107 through the bus 106. When the image signal is read from the image pickup unit 104 in live view mode, it is preferable not to read an image signal from all pixels of the image pickup unit 104, but to intermittently read an image signal. This is for the purpose of reducing the image signal reading and processing time, and enabling real time display. In contrast, when the digital camera is in record mode, an image signal is read from all pixels of the image pickup unit 104.

After the image data is stored in the RAM 107, the microcomputer 101 executes image processing in the image processing circuit 108. First, the WB corrector 108*a* reads the image data stored in the RAM 107, and makes correction by multiplying the image data by white balance correction values instructed by the microcomputer 101 (step S4). Then, the synchronizer 108*b* executes a synchronizing process to generate image data taking three colors as one pixel component from the output of the WB corrector 108*a* by interpolation (step S5). The Y/C separator 108*c* separates the output of the synchronizer 108*b* into brightness data and color difference data (step S6). Then, the color converter 108*d* subject the color difference data separated in the Y/C separator 108*c* to color conversion according to a color matrix instructed by the microcomputer 101 (step S7). Then, the Y/C separator 108*c* stores the separated brightness data in the RAM 107. The color converter 108*d* stores the color converted color difference data in the RAM 107 (step S8).

Figure 5:
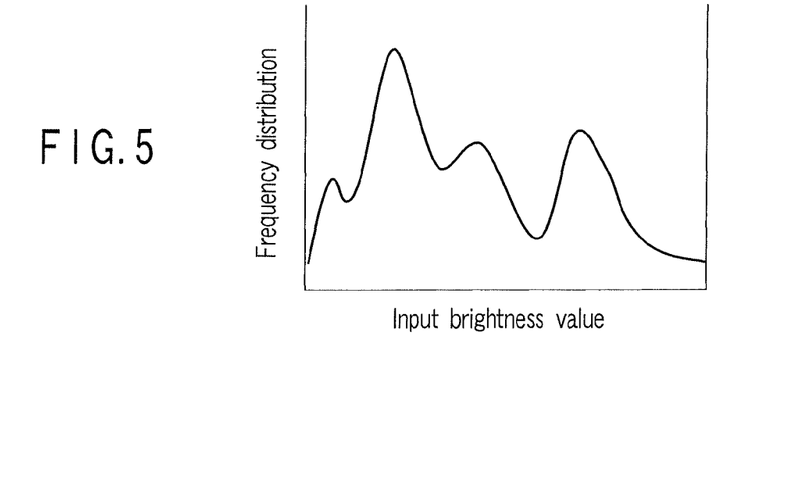
FIG. 5 is a diagram showing an example of a histogram calculated by a histogram calculator.

Next, the microcomputer 101 executes contrast correction in the contrast correction circuit 109. First, the histogram calculator 109*a* sets the histogram calculation area 201 for brightness data for one screen stored in the RAM 107, and reads the brightness data in the set histogram calculation area 201 (step S9). Then, the histogram calculator 109*a* calculates a histogram from the frequency of the brightness data in the read histogram calculation area 201 (step S10), and outputs brightness data corresponding to the center pixel 202 in the histogram calculation area 201 to the contrast corrector 109*d*. FIG. 5 shows an example of a histogram calculated in the histogram calculator 109*a*. The histogram shown in FIG. 5 is calculated by obtaining the frequency distribution in the brightness data in the histogram calculation area 201 from the lower brightness side. Such a histogram indicates the brightness distribution in a part corresponding to the histogram calculation area 201 in the screen.

Figure 6:
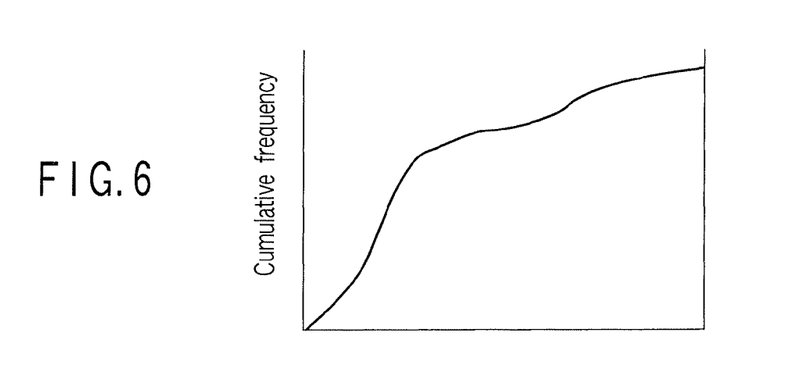
FIG. 6 is a diagram showing an example of a cumulative histogram calculated by a histogram accumulator.

Next, the histogram accumulator 109*b* calculates a cumulative histogram as shown in FIG. 6, by accumulating the histogram calculated by the histogram calculator 109*a* sequentially from the lower brightness side (step S11). Generally, by correcting the contrast of the brightness data in the histogram calculation area 201 by using the cumulative histogram shown in FIG. 6, the largeness of the brightness data is corrected so that the brightness distribution in the histogram calculation area 201 is optimized (the frequency of the brightness data in the histogram calculation area 201 becomes uniform). However, the visibility may be deteriorated in a certain condition of ambient light when an image with an optimized brightness distribution is displayed. Therefore, in this embodiment, a correction table is calculated considering the ambient light intensity in addition to the brightness distribution in a scene, and contrast correction is performed based on this correction table.

Figure 7:
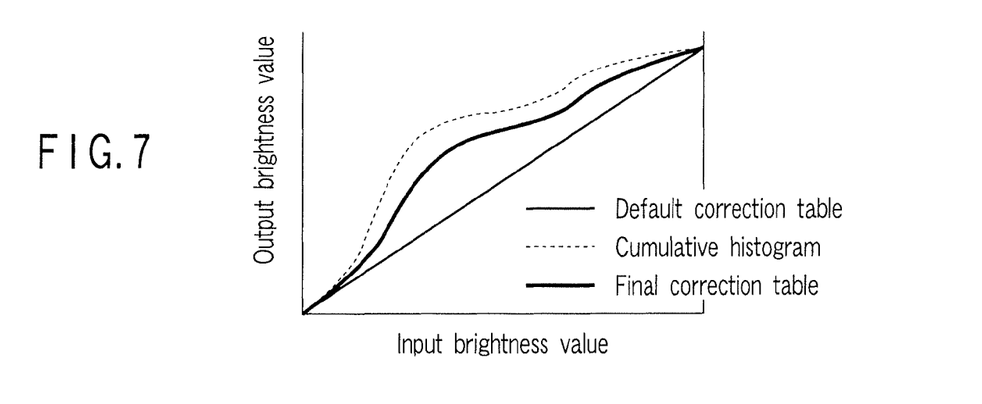
FIG. 7 is a view showing an example of a correction table.

Therefore, the correction table calculator 109c calculates a correction table for making contrast correction of the brightness data of the center pixel 202 in the histogram calculation area 201, from the measurement result of the ambient light sensor 103 and digital camera operation mode instructed by the microcomputer 101 (step S12). FIG. 7 shows an example of a correction table. A correction table (a final correction table shown in FIG. 7) is obtained by composing a default correction table and a cumulative histogram at a predetermined ratio. Here, the default correction table is a correction table having a fixed characteristic that the brightness data before correction (input brightness data) and brightness data after correction (output brightness data) are in a predetermined linear relationship, and is previously stored in the correction table calculator 109c.

Figure 8:
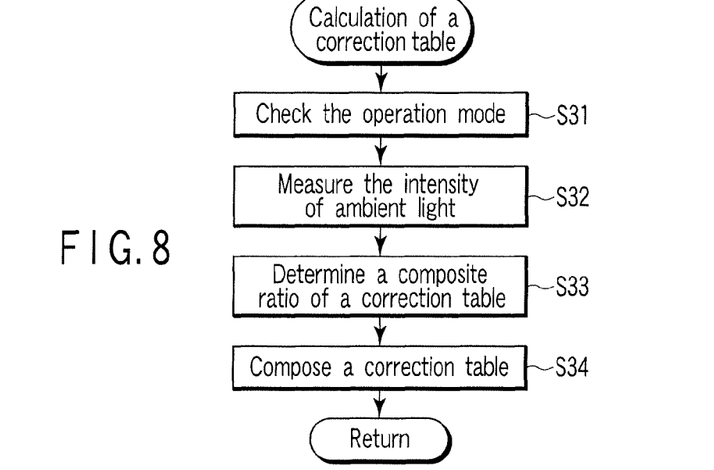
FIG. 8 is a flowchart showing an example of a method of calculating a correction table.

Now, an explanation will be given on a method of calculating a correction table by referring to FIG. 8. FIG. 8 is a flowchart showing an example of a method of calculating a correction table.

First, the correction table calculator 109c receives the information about the digital camera operation mode instructed by the microcomputer 101, and checks whether a current operation mode of a digital camera is live view mode, record mode, or play mode (step S31). Then, the correction table calculator 109c receives the information about the measurement result of the ambient light intensity by the ambient light sensor 103 instructed by the microcomputer 101 (step S32). The correction table calculator 109c determines a composite ratio of default correction table and cumulative histogram, from a current operation mode of a digital camera and ambient light intensity (step S33). After determining the composite ratio, the correction table calculator 109c composes the default correction table and cumulative histogram by using the determined composite ratio (step S34), and then finishes the processing shown in FIG. 8.

Figure 9A:
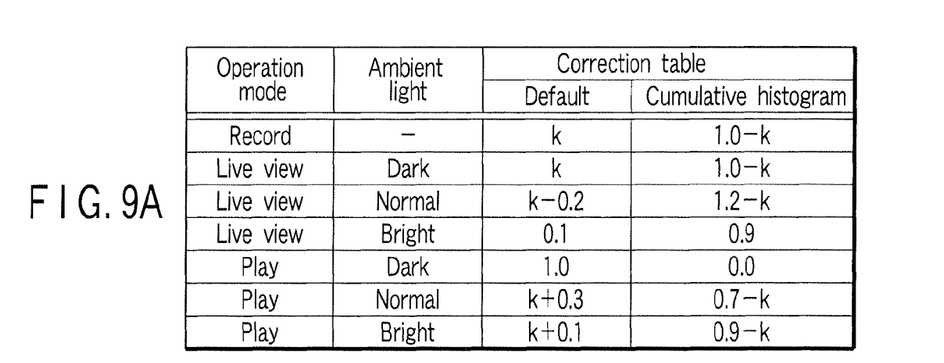
FIG. 9A is a table showing a first example for judging a composition ratio.

FIG. 9A is a view showing an example of a table for determining a composite ratio of a correction table. As shown in FIG. 9A, a composite ratio is determined by a current operation mode of a digital camera and ambient light intensity. When the composition is performed with a higher ratio of the default correction table, the pixel brightness after the contrast correction is corrected to be close to the brightness obtained in the image pickup unit 104. In contrast, when the composition is performed with a higher ratio of the cumulative histogram, the pixel brightness after the contrast correction is corrected so that the frequency of brightness in the histogram calculation area 201 becomes more uniform.

The contrast correction in record mode is for correcting the brightness balance of a subject in an image. Therefore, in record mode, a correction table is calculated at a uniform composite ratio, not depending on the ambient light intensity. In the example of FIG. 9A, in record mode, a composite ratio of a default correction table to a cumulative histogram is set to k:1.0−k, where $0.0 \leq k \leq 1.0$. As to a parameter k for determining a composite ratio, a fixed value optimized for each scene may be stored in the correction table calculator 109c, or may be changed according to a correction intensity instruction given by the user. The smaller the value of k, the stronger the influence of the cumulative histogram, and the better is the effect of contrast correction. For example, in a backlighted scene, the frequency distribution in brightness of an image is made uniform by setting k to a small value, and a dark subject can be isolated clearly from a bright background.

The contrast correction in live view mode is for improving visibility when an image is displayed. Therefore, in live view mode, a correction table is calculated at a composite ratio considering the ambient light intensity. In the example of FIG. 9A, when live view mode is set and the ambient light intensity is smaller than a first threshold value (when a place around the display 110 is dark), a composite ratio of a default correction table to a cumulative histogram is set to be the same as in record mode, k:1.0−k (k is the same value as in record mode, and this is the same in the following). In this case, the same composite ratio as in record mode is used assuming that the visibility of an image is not substantially affected by ambient light. Therefore, the contrast of an image displayed in the display 110 coincides with the contrast of an image recorded on the recording medium 111.

When live view mode is set and the ambient light intensity is greater than a second threshold value larger than the first threshold value (when a place around the display 110 is bright), a composite ratio of a default correction table to a cumulative histogram is set to 0.1:0.9. In this case, the influence of ambient light is strong, the effect of contrast correction is increased to improve the visibility of an image.

Further, when the ambient light intensity is greater than the first threshold value and lower than the second threshold value, the contrast is corrected by some extent. In the example of FIG. 9A, a composite ratio of a default correction table to a cumulative histogram is set to k−0.2:1.2−k. Depending on the setting of k, the composite ratio becomes to be lower than 0.0 or higher than 1.0. In this case, the composite ratio is clipped to 0.0 or 1.0. This is the same in play mode, to be explained later.

In play mode to be described later, the composite ratio is determined so that an image is displayed with the same visibility as in live view mode. Namely, as the image data recorded on the recording medium 111 has been corrected in contrast in record mode, the composite ratio in play mode is determined by taking the contrast correction into account. In the example of FIG. 9A, when play mode is set and the ambient light intensity is lower than the first threshold value (when a place around the display 110 is dark), a composite ratio of a default correction table to a cumulative histogram is set to 1.0:0.0. In this case, the contrast is not corrected, and the contrast of an image upon recording (the same as the contrast in live view mode when ambient light is dark) is kept.

When play mode is set and the ambient light intensity is greater than the second threshold value (when a place around the display 110 is bright), a composite ratio of a default correction table to a cumulative histogram is set to k+0.1:0.9−k. By performing the contrast correction with such a composite ratio, the same contrast correction as that performed in live view mode when the ambient light intensity is high is performed as a result.

Further, when the ambient light intensity is greater than the first threshold value and lower than the second threshold value, a composite ratio of a default correction table to a cumulative histogram is set to k+0.3:0.7−k.

Figure 9B:
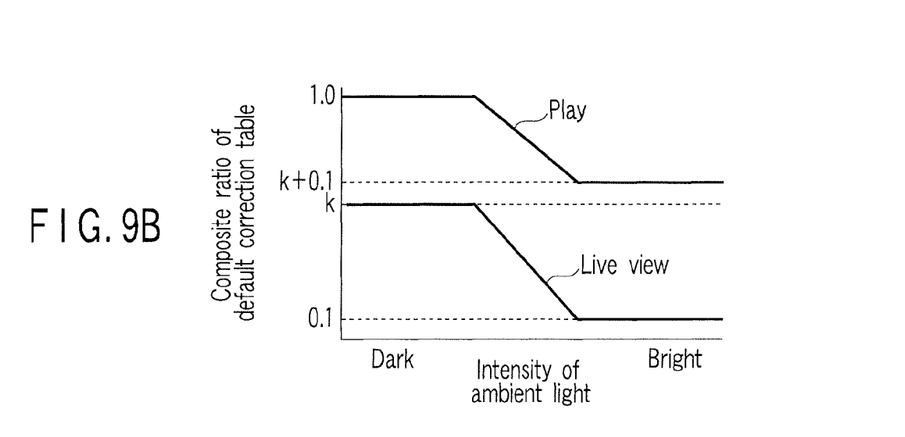
FIG. 9B is a graph showing a second example for judging a composition ratio.

FIG. 9A is a table for setting three steps of threshold for each operation mode, and for selecting one composite ratio among the ratios classified by these threshold values corresponding to the ambient light intensity. In contrast, as shown in FIG. 9B, a composite ratio may be set more finely corresponding to the ambient light intensity. In the example of FIG. 9B, a composite ratio when the ambient light intensity is greater or lower than a threshold value is assumed to be a constant value (e.g., the same value as in FIG. 9A), and a composite ratio corresponding to a medium intensity is obtained by a linear relationship.

Returning to the explanation of FIG. 4, after the correction table calculator 109c calculates a correction table, the contrast corrector 109d performs contrast correction of the brightness data corresponding to the center pixel 202 in the histogram calculation area 201 (step S13). The contrast correction is performed by multiplying the brightness data of the center pixel 202 by the gain amount according to the correction table calculated in step S12. The degree of the contrast of an image is corrected by this. After correcting the contrast, the contrast corrector 109d stores the corrected brightness data in the RAM 107 (step S14). In this way, the contrast of the brightness data of one pixel in the screen is corrected.

After finishing the contrast correction for the brightness data of one pixel, the contrast corrector 109d confirms that the contrast correction for all pixels in one screen is finished, by counting the number of brightness data input to the contrast corrector 109d (step S15). If the contrast correction for all pixels in one screen is found not finished as a result of the judgment in step S15, the contrast correction is performed for the next pixel. Therefore, the contrast corrector 109d instructs the histogram calculator 109a to read the brightness data by shifting the histogram calculation area 201 by one pixel in the horizontal or vertical direction. Then, the operation procedure goes back to step S9.

Further, when the contrast correction for all pixels in one screen is found finished as a result of the judgment in step S15, the contrast corrector 109d informs it to the microcomputer 101. Receiving the information, the microcomputer 101 displays an image in the display 110 (step S16). Namely, the display 110 reads the contrast corrected brightness data and the color converted color difference data stored in the RAM 107, generates a video signal from these brightness data and color difference data, and displays the generated video signal as an image. Then, the microcomputer 101 judges whether the current digital camera operation mode is live view mode (step S17). When the digital camera mode is live view mode in the judgment in step S17, the operation procedure goes back to step S1 to perform display of the next frame.

If the digital camera mode is record mode in the judgment in step S17, the microcomputer 101 causes the JPEG compressor/decompressor 108e in the image processing circuit 108 to compress the contrast corrected brightness data and color converted color difference data stored in the RAM 107 (step S18). Then, the microcomputer 101 creates an image file by adding predetermined header information such as a shooting condition to the image data obtained in the JPEG compressor/decompressor 108e (step S19). Here, in this embodiment, the above-mentioned parameter k for determining the composite ratio is recorded further in the image file header information. The parameter k recorded here is used for contrast correction in play mode. After creating an image file, the microcomputer 101 records the created image file on the record medium 111 (step S20), and then completes the processing of FIG. 4.

Figure 10:
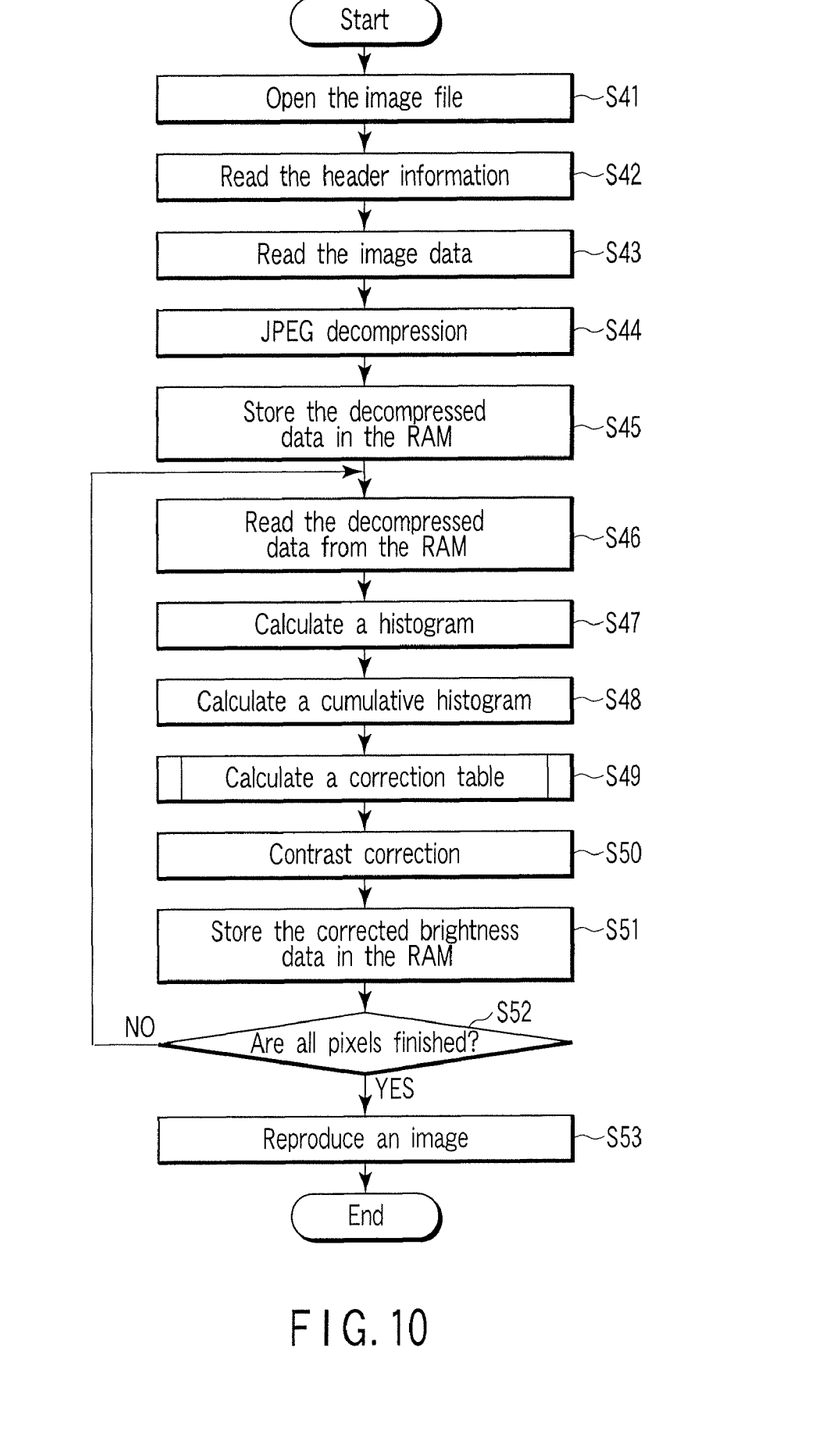
FIG. 10 is a flowchart showing the operation control of the digital camera of FIG. 2 in play mode.

FIG. 10 is a flowchart showing the operation control of a digital camera in play mode. In FIG. 10, when an image file is opened by the user by operating the operating unit 102 (step S41), then the microcomputer 101 obtains k from the header information of the image file (step S42). The microcomputer 101 obtains the image data of the corresponding image file (step S43). Then, the microcomputer 101 causes the JPEG compressor/decompressor 108e in the image processing circuit 108 to decompress the compressed image data (step S44). After decompressing the compressed data, the JPEG compressor/decompressor 108e stores the decompressed image data (brightness data and color difference data) in the RAM 107 (step S45).

Next, the microcomputer 101 executes contrast correction in the contrast correction circuit 109. First, the histogram calculator 109a sets the histogram calculation area 201 for brightness data for one screen, and reads the brightness data in the set histogram calculation area 201 (step S46). Then, the histogram calculator 109a calculates a histogram from the frequency of the brightness data in the read histogram calculation area 201 (step S47). At the same time, the histogram calculator 109a outputs the brightness data corresponding to the center pixel 201 in the histogram calculation area 201 to the contrast corrector 109d.

Then, the histogram accumulator 109b calculates a cumulative histogram by sequentially accumulating the histogram calculated by the histogram calculator 109a from the lower brightness side (step S48). Then, the correction table calculator 109c calculates a correction table from the cumulative histogram calculated by the histogram accumulator 109b, the measurement result of the ambient light sensor 103 instructed by the microcomputer 101, and the value of k, by using the relationship shown in FIG. 9A or 9B (step S49). After the correction table calculator 109c calculates a correction table, the contrast corrector 109d corrects the contrast of the brightness data corresponding to the center pixel 201 in the histogram calculation area 201 (step S50). After the contrast correction, the contrast corrector 109d stores the corrected brightness data in the RAM 107 (step S51). After the contrast correction for brightness data of one pixel is completed, the contrast corrector 109d judges whether the contrast correction for all pixels in one screen is completed, by counting the number of brightness data input to the contrast corrector 109d, for example (step S52). When the contrast correction for all pixels in one screen is found not completed as a result of the judgment in step S52, the contrast corrector 109d sends an instruction to the histogram calculator 109a to read brightness data by shifting the histogram calculation area 201 by one pixel, in order to perform the contrast correction for the next pixel. Then, the operation procedure goes back to step S46.

In contrast, when the contrast correction for all pixels in one screen is found completed as a result of the judgment in step S52, the contrast corrector 109d informs it to the microcomputer 101. Receiving the information, the microcomputer 101 displays an image in the display 110 (step S53). Then, the operation procedure of FIG. 10 is completed.

The operation in play mode shown in FIG. 10 is not necessarily performed in a digital camera. For example, the operation shown in FIG. 10 may be executed in an image reproducing apparatus having only a function of reproducing images.

As explained herein, in this embodiment, a correction table is calculated for correcting the contrast of an image by units of one pixel according to the ambient light intensity measured by the ambient light sensor 103 and the brightness distribution in the histogram calculation area 201. A partial contrast of an image is corrected. Therefore, the visibility of an image can be improved without correcting the brightness of backlight of the display 110, and the visibility is not deteriorated even in a particular scene such as a backlighted scene.

Further, as the contrast correction is different in operation modes, it is possible to optimize the visibility of a displayed image and the contrast of a recorded image according to operation modes.

In the example explained above, the histogram calculation area 201 is shifted by one pixel by one pixel, but if the contrast of pixels in the histogram calculation area 201 is uniformly corrected, the histogram calculation area can be shifted by units of 65 pixels.

The intensity of ambient light is detected by the ambient light sensor 103 in the embodiment explained above, but ambient light may be detected by evaluating the brightness of a subject at each part of an image obtained through the image pickup unit 104.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus comprising:
    a display which displays an image based on an image signal;
    an ambient light measuring unit which measures the intensity of ambient light around the display;
    a brightness distribution measuring unit which measures a brightness distribution for each of a plurality of areas included in a scene, each of the plurality of areas including a predetermined number of pixels, when the image signal is obtained;
    a parameter calculator which calculates, for each of the plurality of areas, a correction parameter for correcting a partial contrast of the image based on the ambient light intensity and brightness distribution of each of the plurality of areas in the scene; and
    a contrast correction unit which corrects a partial contrast of the image by correcting the image signal for each of the plurality of areas by using the correction parameter calculated for each of the plurality of areas,
    wherein an area of the plurality of areas is (A) shifted in a horizontal direction by predetermined pixels each time the contrast correction for the area is completed, and (B) shifted in a vertical direction by predetermined pixels each time the contrast correction in the horizontal direction is completed.

2. The image display apparatus according to claim 1, wherein the correction parameter includes a parameter to correct the degree of contrast of the image.

3. The image display apparatus according to claim 1, wherein the parameter calculator includes:
    a fixed contrast correction table memory which stores a fixed contrast correction table for making fixed contrast correction of the image signal;
    a cumulative histogram calculator which calculates a cumulative histogram for each of the plurality of areas by accumulating the brightness distribution of each of the plurality of areas measured by the brightness distribution measuring unit; and
    a composite unit which calculates the correction parameter for each of the plurality of areas by composing the fixed contrast correction table and cumulative histogram of each of the plurality of areas at a composite ratio determined according to the intensity of ambient light measured by the ambient light measuring unit.

4. An image pickup apparatus comprising:
    an image pickup unit which shoots a scene to obtain an image signal;
    an image recorder which records the obtained image signal on a recording medium;
    a display which displays an image based on the image signal;
    an ambient light measuring unit which measures the intensity of ambient light around the display;
    a brightness distribution measuring unit which measures a brightness distribution for each of a plurality of areas included in a scene, each of the plurality of areas including a predetermined number of pixels, when the image signal is obtained;
    a parameter calculator which calculates, for each of the plurality of areas, a recording correction parameter for correcting a partial contrast of an image to be recorded on the recording medium based on the brightness distribution in the scene, and calculates, for each of the plurality of areas, a display correction parameter for correcting a partial contrast of an image to be displayed in the display based on the ambient light intensity and brightness distribution of each of the plurality of areas in the scene; and
    a contrast correction unit which corrects a partial contrast of the image to be recorded on the recording medium by correcting the image signal for each of the plurality of areas by using the recording correction parameter calculated for each of the plurality of areas, and corrects a partial contrast of the image to be displayed in the display by correcting the image signal for each of the plurality of areas by using the display correction parameter calculated for each of the plurality of areas,
    wherein an area of the plurality of areas is (A) shifted in a horizontal direction by predetermined pixels each time the contrast correction for the area is completed, and (B) shifted in a vertical direction by predetermined pixels each time the contrast correction in the horizontal direction is completed.

5. The image pickup apparatus according to claim 4, wherein the recording correction parameter and display correction parameter include a parameter to correct the degree of contrast of the image.

6. The image pickup apparatus according to claim 4, wherein the parameter calculator includes:
    a fixed contrast correction table memory which stores a fixed contrast correction table for making fixed contrast correction of the image signal;
    a cumulative histogram calculator which calculates a cumulative histogram for each of the plurality of areas by accumulating the brightness distribution of each of the plurality of areas measured by the brightness distribution measuring unit; and
    a composite unit which calculates the recording correction parameter for each of the plurality of areas by composing the fixed contrast correction table and the cumulative histogram for each of the plurality of areas at a predetermined composite ratio, and calculates the display correction parameter for each of the plurality of areas by composing the fixed contrast correction table and the cumulative histogram for each of the plurality of areas at a composite ratio determined according to the intensity of ambient light measured by the ambient light measuring unit.

7. The image pickup apparatus according to claim 6, wherein the image recorder records a composite ratio determining parameter for determining the predetermined composite ratio on the recording medium together with the image signal.

8. The image pickup apparatus according to claim 7, wherein the composite unit composes the fixed contrast correction table and the cumulative histogram for each of the plurality of areas at a composite ratio determined based on the composite ratio determining parameter and the ambient light intensity measured by the ambient light measuring unit, and calculates a reproduction correction parameter used for a partial contrast correction upon reproduction of the image signal recorded on the recording medium;

the contrast correction unit corrects the partial contrast of the image recorded on the recording medium by using the reproduction correction parameter; and the display displays an image with the partial contrast corrected by using the reproduction correction parameter.

9. The image pickup apparatus according to claim 8, wherein the reproduction correction parameter is calculated as a value at which the contrast of an image corrected by using the reproduction correction parameter coincides with the contrast of an image corrected by using the display correction parameter.

10. An image reproducing apparatus comprising:
  a reading unit which reads an image signal obtained by shooting a scene and a composite ratio determining parameter for calculating a reproduction correction parameter used for a partial contrast correction when reproducing the image signal, from a recording medium;
  a display which reproduces the read image signal to display an image;
  an ambient light measuring unit which measures the intensity of ambient light around the display;
  a brightness distribution measuring unit which measures a brightness distribution for each of a plurality of areas included in a scene, each of the plurality of areas including a predetermined number of pixels, when the image signal is obtained;
  a parameter calculator which includes:
    (1) a fixed contrast correction table memory which stores a fixed contrast correction table for making fixed contrast correction of the read image signal;
    (2) a cumulative histogram calculator which calculates a cumulative histogram for each of the plurality of areas by accumulating the brightness distribution of each of the plurality of areas measured by the brightness distribution measuring unit; and
    (3) a composite unit which calculates the reproduction correction parameter for each of the plurality of areas by composing the fixed contrast correction table and the cumulative histogram for each of the plurality of areas at a composite ratio determined based on the composite ratio determining parameter and the intensity of ambient light measured by the ambient light measuring unit; and
  a contrast correction unit which corrects a partial contrast of the image by correcting the read image signal for each of the plurality of areas by using the reproduction correction parameter calculated for each of the plurality of areas.

11. An image displaying method comprising:
  measuring the intensity of ambient light around a display;
  measuring the brightness distribution for each of a plurality of areas included in a scene, each of the plurality of areas including a predetermined number of pixels, when obtaining an image signal to indicate an image to be displayed in the display;
  calculating, for each of the plurality of areas, a correction parameter for correcting a partial contrast of the image based on the ambient light intensity and the brightness distribution of each of the plurality of areas in the scene;
  correcting the partial contrast of the image by correcting the image signal for each of the plurality of areas by using the correction parameter calculated for each of the plurality of areas; and
  displaying the image with the corrected partial contrast in the display,
  wherein an area of the plurality of areas is (A) shifted in a horizontal direction by predetermined pixels each time the contrast correction for the area is completed, and (B) shifted in a vertical direction by predetermined pixels each time the contrast correction in the horizontal direction is completed.

\* \* \* \* \*